(12) United States Patent
Stoyle

(10) Patent No.: US 6,777,933 B2
(45) Date of Patent: Aug. 17, 2004

(54) METHOD FOR COMPENSATING FOR EFFECTS OF OBJECT MOTION IN AN IMAGE

(75) Inventor: Peter N R Stoyle, Malvern (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 10/313,014

(22) Filed: Dec. 6, 2002

(65) Prior Publication Data
US 2003/0130574 A1 Jul. 10, 2003

(51) Int. Cl.⁷ ............................................. G01V 3/00
(52) U.S. Cl. ........................ 324/306; 324/309; 600/410
(58) Field of Search ............................... 324/306, 309, 324/307, 312, 314, 300; 600/410, 416, 419

(56) References Cited

U.S. PATENT DOCUMENTS

| | | | |
|---|---|---|---|
| 5,051,903 A | * | 9/1991 | Pelc et al. ................... 324/309 |
| 5,382,902 A | * | 1/1995 | Taniguchi et al. ........... 324/309 |
| 5,933,006 A | * | 8/1999 | Rasche et al. .............. 324/307 |
| 6,114,852 A | * | 9/2000 | Zhou et al. ................. 324/306 |
| 6,587,707 B2 | * | 7/2003 | Nehrke et al. .............. 600/410 |
| 6,675,034 B2 | * | 1/2004 | Sussman et al. ............ 600/410 |

* cited by examiner

Primary Examiner—Louis M. Arana
(74) Attorney, Agent, or Firm—Nixon & Vanderhye P.C.

(57) ABSTRACT

A method for compensation for object motion during scan, especially an magnetic resonance imaging (MRI) scan is provided. The method involves taking a first data set corresponding to a first focussed image and adding a number of data points to form a sligthly higher resolution image. The first data set is then used to predict what the next data points would be. The prediction can be performed in k-space, image space or in a hybrid space. The predicted data points arm then compared with the actual data points acquired as a means of determining any displacements. The displacements may be determined by comparing the phases of the actual and predicted data points and the k-space data corrected to compensate for any detected motion.

17 Claims, 6 Drawing Sheets

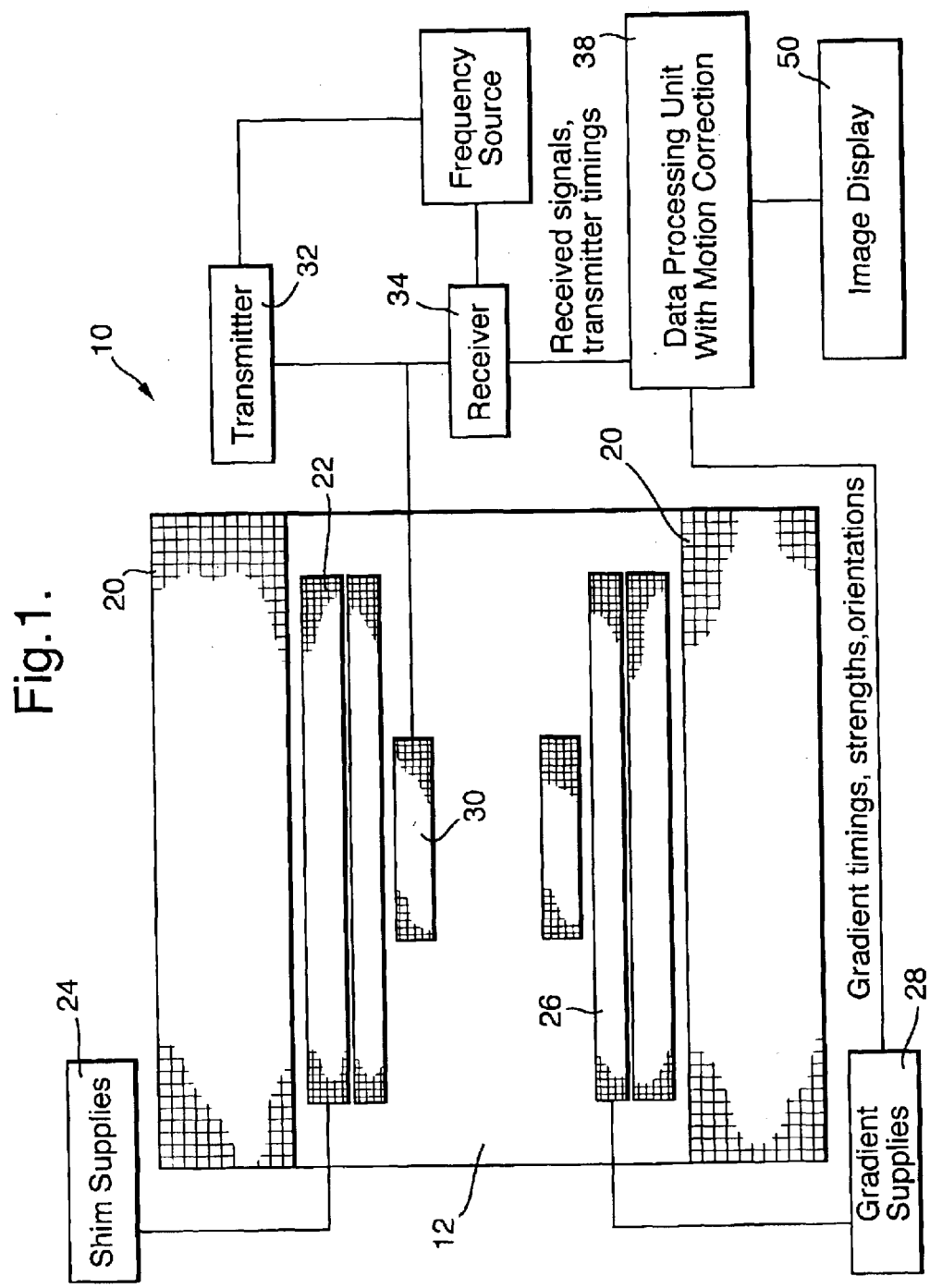

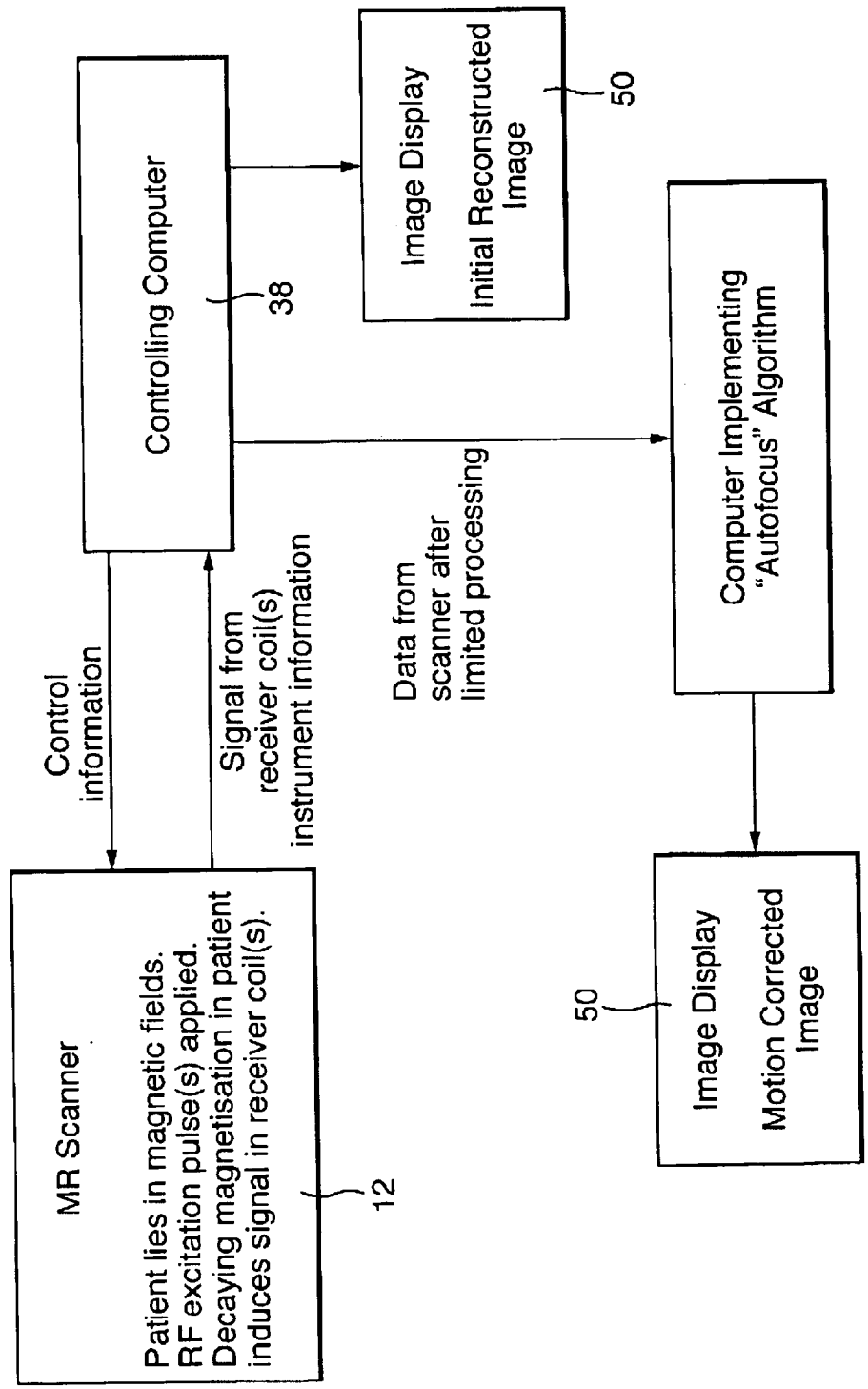

METHOD FOR COMPENSATING FOR EFFECTS OF OBJECT MOTION IN AN IMAGE

This invention relates to a method of reducing the effects of motion of objects in an image, in particular to a method of reducing the effects of motion in magnetic resonance imaging. The invention particularly relates to a method of compensating for patient motion to produce a focussed image.

Magnetic resonance imaging or MRI is a well known medical imaging technique. In essence the technique relies on the reaction of the magnetic moments of certain nuclei to applied magnetic fields. Protons and neutrons, the basic constituents of nuclei, posses magnetic dipole moments. In nuclei with an even number of protons and an even number of neutrons the net effect is no residual magnetic moment. However nuclei with uneven atomic number (or uneven atomic mass) have a net magnetic dipole and hence a magnetic moment. At room temperature in the absence of an external magnetic field one would expect to find a random orientation of magnetic moments in a medium.

In an MRI imaging system an intense magnetic field is applied to the area to be imaged. This field is applied in one direction, conventionally referred to as the z-direction. The effect of the applied field is to align the magnetic dipoles in the item being imaged. The dipoles do not all line up in exactly the same way however. The dipoles tend to adopt either an orientation lined up in the same direction as the field, referred to as parallel, or an orientation where the dipoles align opposite the field direction, the antiparallel orientation. At room temperature, due to the parallel state being slightly more energetically favourable, slightly more nuclei tend to adopt the parallel configuration than the antiparallel configuration. This results in a net overall magnetic moment for the medium, parallel to the applied field.

The coupling effects of the magnetic moment of the nuclei with the applied field does not cause an exact alignment of the nuclear moment with the applied field. Instead the magnetic moment processes around the applied field. The frequency of precession, called the Larmor frequency, is proportional to the strength of the applied field. The stronger the applied field the faster the rate of precession.

In effect one can consider that the dipole moments of the nuclei have aligned so there is a component of the moment in the z-direction and a component rotating in the x-y plane at the Larmor frequency. As mentioned, throughout the whole object being imaged there is a greater component parallel to the z-direction than antiparallel so there is a net moment for the object. However the components in the x-y plane are still randomly arranged in the presence of a single field so there is no net moment in the x-y plane.

Applying an RF magnetic field at the Larmor frequency perpendicular to the applied field causes the dipoles to tip into the transverse, or x-y, plane. It also causes alignment of the dipoles. The net result is then a net magnetic moment in the x-y plane rotating at the Larmor frequency.

When the RF field is removed this net magnetic moment can be measured due to the inductance caused in receiver coils. Of course once the RF field is removed the net magnetisation of the item being imaged will start to revert to what it had been as the magnetic moments of the nuclei begin to align with the z-direction again.

There are two separate decay processes that occur. The first is the increase in the z-direction component of overall magnetic moment. Thus is sometimes referred to as longitudinal or spin axis relaxation and is due to the transfer of energy between excited nuclei and the lattice, or nearby macro-molecules. The second process, which is independent of the first, is that the precession of the moments of the nuclei, which had been brought into in phase by the transverse rf field, start to de-phase reducing the x-y component. The de-phasing process. known as transverse relaxation or spin-spin interaction is due to transfer of energy between nuclei in different states and also from magnetic field inhomogenities. In both decay processes the different types of material present in an object, say the differing types of tissue in a patient, will affect the relaxation processes. Hence measuring the differing strengths of signal received by the different types of tissue will reveal contrast in an image.

In order to form an image it is necessary to encode the dipoles of the signals emitted by the nuclei after magnetization have information regarding to the spatial positioning of those nuclei. The imaging processes can usually be described in the following terms. First of all is the step of selecting an image slice, i.e. a small volume to be imaged, and then spatially encoding the magnetic resonance signal emanating from that slice. The basis for this is that the frequency at which a nucleus resonates, its Larmor frequency, is a function of the strength of the static magnetic field in which it is located. Therefore by altering the strength of the magnetic field as a function of position, i.e introducing a magnetic field gradient, the Larmor frequency will also vary as a function of position.

Typically therefore a weak magnetic field that changes linearly with position is superimposed on the main static field to create a magnetic field gradient along the z-direction. An RF pulse with a narrow range of frequencies is then applied transversely. Only those nuclei whose Larmor frequency matches the frequency of the applied RF pulse will actually absorb the RF energy and undergo the tipping and alignment described above. Therefore by a careful choice of RF frequency only a narrow band or slice of the object being imaged will be excited.

Having selectively excited a slice of the object to imaged it is necessary to achieve spatial resolution within in a slice. Spatial resolution in one dimension, say the x-direction, can be achieved through use of a frequency encoding gradient. Immediately following the RF excitation pulse all spins of the nuclei of interest within the selected slice will be processing at the same frequency. Application of an additional gradient, orthogonal to the z-direction gives spatial resolution in one dimension. This additional gradient, known as a frequency encode gradient, will alter the Larmor frequency of the spin precession across the slice and allow spatial resolution.

Note that for medical MRI the nuclei of interest is almost exclusively the nucleus of hydrogen. However other nuclei species could be of interest in certain applications.

To get two dimension resolution across the slice it is necessary to use a phase encode step as well. Here following the RF excitation pulse a phase encoding gradient is applied in the y-direction for a short time. Remember that immediately following the RF excitation pulse all the spins in the selected slice will be in phase and processing at the same frequency. If a phase encode gradient is applied in the y-direction the spins will have their resonant frequencies, and hence the rate of procession, altered according to their position along the y-direction. When the phase enode gradient is removed all nuclei in the slice will again be subject to the same static field strength and hence the spins will again start to precess at the same frequency. The effect of the phase encode gradient will have been to alter the phase of the spins according to their position along the y-axis in a known manner. The frequency encode gradient may then be re-applied.

The measured signal at a particular frequency (and therefore position along the x-axis) is the sum of all the vector contributions from a row of spins in the y-direction. The actual signal measured of course is a composite of all the frequency components along the x-axis.

To generate an image during the time that the frequency encode gradient is applied the signal is sampled $N_x$ times yielding a pe-line, which is a vector or line of data having $N_x$ points. Repeating the measurements $N_y$ times for differing values of the y-gradient yields a matrix of $N_x \times N_y$ amplitude points. In general to generate a final image of N×N pixels the phase encoding step must be repeated N times with different values of the phase encoding gradient.

Other acquisition schemes for slice or volume imaging exist which gather the data in different ways, however the basic principles remain the same. Also there are a number of different imaging sequences that can be applied. However in all cases the raw data collected exists in what is called k-space.

To obtain the image a Fourier transform is performed along both the x and y axes to produce a 2D spectrum of data points whose intensity is representative of signal distribution in the imaging slice.

Patient movement during the acquisition of MRI images results in degradation of the images that can obscure the clinically relevant information. Each readout period takes a few milliseconds, i.e readout of the series of $N_x$ data points (known as a phase encode line), whereas the time interval between readouts, i.e. the next value of phase encode gradient, might be between 100 and 400 ms. The majority of blurring and ghosting artefacts caused by patient motion are due to motion between lines in k-space, rather than motion during a single readout.

Movement leads to errors between lines of k-space which, in the resulting image, appear as blurring and ghosting, which may be in the phase encode (pe) and frequency encode (fe) directions. These errors can result from translational movement in the pe and fe directions and also rotational movement. Translations of the patient in the readout direction result in a frequency dependent phase shift in each line of k-space. Rotations in the spatial domain are also rotations in k-space and result in k-space changes that are more complicated function of position in k-space.

Various techniques have been employed to try to correct for image artefacts introduced into an image through motion. However most of the techniques known for correcting for patient motion involve a modified signal acquisition technique which may involve additional scans or even additional equipment.

International Patent Application WO98/01828 discloses a technique for reducing the effect of motion induced artefacts in an image using purely post data gathering signal processing effects. In the technique described therein the data is manipulated to counteract possible movement induced artefacts and the manipulated data compared using a focus condition to see if the image quality is improved. This technique can involve a large amount of processing due to the need to perform a high dimensional search in motion parameter space. Furthermore the method may involve the grouping of k-space lines to more accurately determine motion parameters, although this grouping can decrease the temporal resolution of the motion found.

Another method of correcting for motion induced image artefacts in the method of Projection onto Complex Sets (POCS) Hedley M, Hong Y and Rosenfeld D. "Motion Artifact Correction in MRI using generalized projections" IEEE Trans. Med. Imag., 10:40–46, 1991. This is a method whereby a good quality image is used to form a binary mask. The mask defines the tissue-air boundary, i.e. outside the mask there should be no signal. Motion induced artefacts in the acquired image cause apparent signal in the air. The POCS method sets all outside the mask in the acquired image to black. The image data is then Fourier transformed to k-space. A new complex k-space is formed from the modulus of the measured data and the phase of the estimation from the previous step. This new k-space is Former transformed to the image domain and the process iterates. This method however involves a large amount of Fourier transformation as the process iterates and hence involves a large amount of computational effort and hence time. Further the method requires the spatial alignment of the binary mask with the acquired image before processing which is not always possible to achieve.

The present invention seeks to provide an alternative method for correcting for motion induced artefacts in an image.

Thus according to the present invention there is provided a method of producing an image of a scanned object corrected for artefacts introduced by unwanted motion of said object during the scan comprising the steps of taking a k-space image data set comprising a number of data points derived from the object scan, forming an first data set from some of the k-space image data points, adding at least one additional data point to the first data set to form a second data set, predicting, from the first data set, the at least one added data point, comparing the at least one added data point with the predicted at least one data point to determine the extent of any motion and correcting the at least one added data point to compensate for any detected motion.

An MRI image, as discussed above, is generally collected as an array of data points in k-space. Each k-space data point contributes to the whole image. Thus any set of k-space data points, which is not undersampled and includes zero spatial frequency, can be used to form an image. The resolution of the image is increased as the number of k-space space data points used to form that image is increased.

The present invention resides in the fact that a lower resolution image, formed by a sub-set of k-space data points, can be used to predict what a next data point or set of points would be. A data point or set of data points may be conveniently termed a data vector. The method according to the present invention is therefore what may be termed a direct focussing method wherein the extent of any motion is determined directly through calculation. This greatly reduces the amount of processing required as compared with focussing methods using focus criteria which require large numbers of high dimensional searches to be performed in motion parameter space. This offers advantages not only in speed but also offers a greater degree of robustness in the focussing method in that focussing methods utilising focus criteria can converge to local rather than global minima, thus giving bad estimates of motion.

The prediction could be carried out using the raw k-space first data set. Alternatively the prediction could be carried out in image space using an image formed from the first data set. It is noted here that the term image is used to refer to the complex data set obtained by performing a two dimensional Fourier transform (Fr) on the k-space data set. The actual visual image used is obtained by the amplitude of the real part of this image.

As a further alternative the prediction could be performed in hybrid space. Hybrid space is obtained by Fourier transforming the k-space date set in one direction only. Different hybrid spaces are obtained by performing the Fr in either the frequency encode (FE) direction or the phase encode (PE) direction. Conveniently FE transformed hybrid space could be used.

Performing the prediction on the raw k-space data removes the need for any Fourier transforms to be performed and offers the quickest processing. However as the k-space data varies to a greater extent than image space or hybrid space accurate prediction is harder. Complex image space can be used but use of hybrid space can offer good predictability without undue processing requirements.

The invention is based on the fact that, as the resolution of an image is increased by adding data points to the k-space data, these new data points added are largely predictable from the data set existing before the new data was added, assuming no patient motion occurred while the new data was added.

Motions of the patient occurring during the acquisition of new line of phase encode data translate to phase ramps on that pe line which can be noticeable in the image or the data in k-space or hybrid space. The predicted complex data added is preferably compared with the actual phase of the added data and the difference between them used to determine the extent of any motion. Any displacements present in the frequency encode direction may be determined before determining any displacement in the phase encode direction. Conveniently then the displacement in one direction may be compensated for before determined the extent of any displacement in the other direction.

The present invention is preferably used inductively. A focussed low resolution image is used as the first data set and data points added thereto to form the second data set. Once the added data points have been corrected to compensate for any detected displacements the focussed second data set can be used as the staffing point, i.e. the first data set, in the next iteration. One advantage of the present invention is that only displacement associated with those points added need be considered as the first data set is focussed.

Preferably the first data set comprises a number of phase encode lines. A phase encode line represents a series of data points taken after a particular phase encode gradient was applied. As the data points making up a phase encode line are typically taken in a fraction of a second there will not normally be significant distortion intra line due to object motion. Therefore one can concentrate purely on the motion increment between successive phase encode lines, which can be assumed near constant for the whole line.

The data points added to the first data set to form the second data set are also conveniently made up of a number of phase encode lines. As mentioned above the phase encode line can be considered to have minimal motion effects intra-line. Therefore adding a whole pe line or more than one line at a time is a convenient way of building up to the full resolution image. However a complete set of phase encode lines covering all spatial frequencies in an image can take tens of seconds to gather which can result in the need to compensate for object motions between lines. It is possible however to add smaller groups of data points or even a data point at a time if required however.

In order to make prediction easier and maximise accuracy the phase encode lines arm preferably added one at a time.

When the first data set comprises only a very few phase encode lines it is more difficult to predict what the added data points may be as there is less information for the prediction. Therefore a first data set comprising a certain number of phase encode lines, say 8 or 10, may be taken as the starting first data set and phase encode lines added one at a time, or in pairs, symmetrically about DC, to build up to a full resolution image. This starting first data sat image may be initially focussed using some other means, such a focus criterion. The starting first data set is preferably chosen to be symmetrical about DC. The additional phase encode lines can then be added sequentially alternating on either side of DC. DC is point which corresponds to no phase encoding gradient applied and no frequency encode gradient, i.e. the zero or centre point in k-space. It corresponds to zero spatial frequency in the PE & FE directions, in the raw data space. It should of course be noted that the phase encode lines need not have been acquired sequentially in time. It is best however if the image is built up sequentially in terms of k-space lines as 'holes' in the block of k-space lines would be similar to an undersampled data set and could result in artefact in the image.

The term phase encode line here should not been seen as limiting. It will be apparent to the person skilled in the art that the methodology is also applicable to non Cartesian data sets, such as generated in polar-type acquisitions. By the term phase encode line is simply meant a set of data points taken at one particular phase encode gradient value.

One way of determining displacements in the frequency encode direction is to perform a ID Fourier transform along the Frequency encode direction on the firs k-space data set to form an hybrid space data set. The hybrid space data set is then analysed to predict what the next line of hybrid space data would be. The hybrid data set together with the predicted data are then transformed back into k-space to provide a predicted line in k-space. A pointwise ratio of the predicted k-space line to the actual k-space line added is then formed and the amount of linear phase variation used as an estimation of displacement in the FE direction. The added data is then corrected to compensate for the determined FE displacement. Alternatively the vector ratio of the predicted k-space line and actual added line is Fourier transformed and the position of the frequency encode spectral maximum relative to DC used to give an estimation of the displacement in the FE direction.

In order to then compensate for any displacements in the PE direction the phase of the frequency encode spectral maximum relative to DC is used as an estimation of displacement in the PE direction.

Preferably the object scan is performed with a magnetic resonance imager.

Conveniently the method of the present invention is implemented as a computer programme for automatic focussing of an MRI image.

The invention will now be described by way of example only with reference to the following drawings of which;

FIG. 1 shows a schematic diagram of a magnetic resonance imaging system,

FIG. 2 shows a functional diagram of the operation of the system of FIG. 1,

Figure 3B:
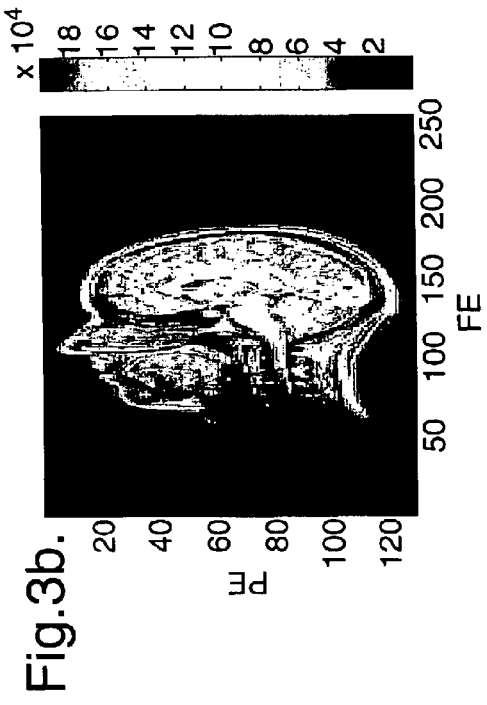
FIG. 3 shows the effect of object motion on a full resolution MRI image.

Referring to FIG. 1 there is shown a schematic diagram of a magnetic resonance imaging system 10. The system 10 incorporates a magnetic resonance imaging scanner 12 of conventional type. The scanner 12 has a superconducting or resistive main magnet 20 which generates a magnetic field sufficiently strong to cause a net alignment along the field direction of atomic nuclei within a patient. The scanner 12 also includes shim coils 22 in order to correct for undesired inhomogeneities in the magnetic field of the main magnet 20. The magnetic field produced by the shim coils 22 is controlled by a shim coil power supply unit 24.

The resonance frequency of particular atomic nuclei is characteristic of the nucleus and the strength of the applied magnetic field. In order to provide spatial information a magnetic field gradient is generated by gradient coils such as coils 26. Gradient coils are often arranged to generate gradient fields in three orthogonal directions. The magnetic fields generated by the gradient coils are controlled by a gradient coil power supply unit 28. In order to generate a signal from the atomic nuclei of the patient a radio-frequency magnetic pulse is generated by transmit coil 30. This pulse 'flips' the angle of the nuclear spins within a certain patient slice of volume. These excited spins or magnetizations then induce a current in the receive coil which may be the same coil as the transmit coil 30. The coil 30 is connected to a transmit unit 32 and a receive unit 34, each of which also receives signals from a frequency source 36.

The system 10 includes a controlling computer 38 which controls the operation of the components of the system 10. The computer 38 controls the gradient coil power supply unit 28 in the form of gradient timing, magnetic field strength and orientation control. In addition, the computer receives signals from the receive unit 34 together with transmitter timings.

In order to form an image of the organs of a patient, the patient is inserted into the system 10 and a series of measurements are taken with different combinations of static and/or varying gradient fields. The signals from the tissue of the patient depend on the tissue's properties, the magnetic field gradient strengths, gradient orientations and timings with respect to the applied radio frequency pulses. The varying gradients code the received signal's phase, frequency and intensity. The received signals as a function of time form an ordered set which is stored in memory in the computer 38 for subsequent processing.

In a subsequent signal processing stage a Fourier transform may be performed on the ordered set of received signals, with the modulus of the transform being used to assign the signals to a grey scale in order to form an image. The set of received signals is said to exist in k-space.

In a conventional MRI if a patient moves during the acquisition of data the received signal is affected and part of the k-space signal is corrupted by phase errors. Because of the way the image is reconstructed this motion affects the whole image, causing blurring and/or ghosting artefacts in the final image.

Figure 3A:
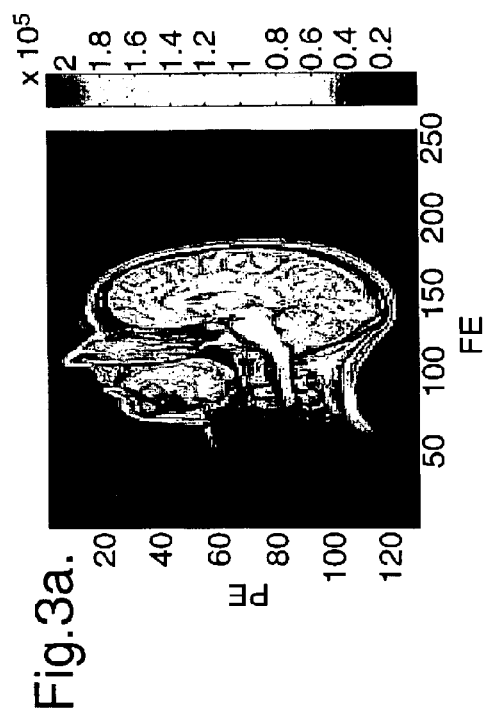

FIG. 3 shows the effect of motion on an image. FIG. 3a shows a full resolution MRI image. FIG. 3b shows the same image but with an engineered displacement. The displacement was introduced at line DC+18 and consisted of a frequency encode displacement of 1 pixel and a phase encode displacement of −2 pixels. In this example 1 pixel is about 2 mm. The effect on the formed image is quite noticeable in that the image with a displacement is clearly less focussed and well defined. The clinical value of such an image is therefore correspondingly reduced.

Referring now to FIG. 2 there is shown a functional block diagram of the operation of the system 10. The computer 38 controls and receives information from the scanner 12 and uses this information to generate an image on display 50. This image is an initial reconstructed image. If an operator of the system 10 considers that the initial image is corrupted an additional signal processing routine is selected. Alternatively the further signal processing could occur automatically. In either case the stored image data is processed to reduce the effects of the patient's motion.

In the present invention focussing is performed by an incremental procedure of focussing a low resolution image and then proceeding to a slightly higher resolution and concentrating on just the new data points added. The amount of patient motion is determined by comparing the added data to predicted data.

In one embodiment of the invention the slightly higher resolution image is formed by adding one additional phase encode line to the low resolution image. In other words, consider 2 m+1 phase encode lines, where m is a small positive integer, symmetrically straddling DC. These are the phase encode spatially frequency, or k-space, lines k where $-m \leq k \leq m$, with DC at k=0. Each phase encode (PE) line consists of $n_{fe}$ data points, i.e. the data points taken in the frequency encode direction. The $n_{fe}$ data points in a phase encode line are acquired within a few milliseconds and so normally there will be no significant image distortion arising from motion effects within a phase encode line.

Figure 4B:
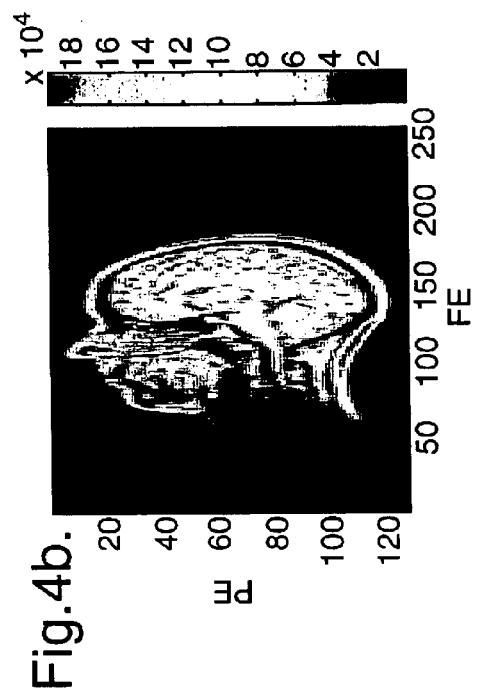
FIG. 4 shows a lower resolution image than that shown in FIG. 3.
Figure 4A:
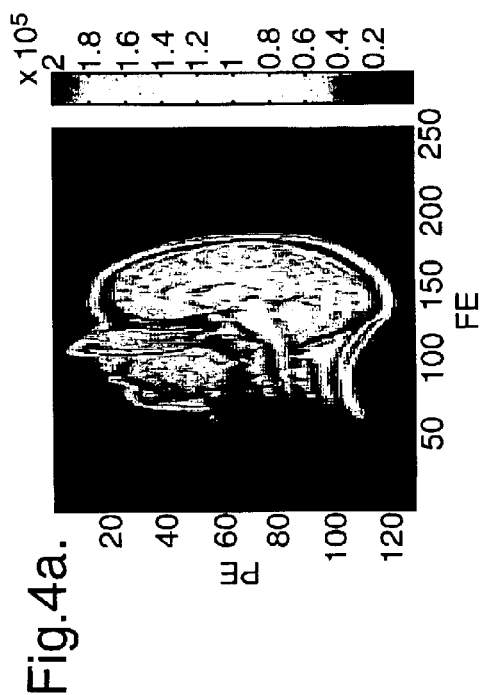

From this first data set of (2 m+1) by $n_{fe}$ points a low resolution complex MRI image $I_{2m+1}$ may be formed in the usual way by two dimensional Fourier transform (FT). FIG. 4 shows an example of a low resolution image obtained this way. The image is focussed in FIG. 4a and defocussed in FIG. 4b. As the method according to the present invention is inductive the lower resolution image is focussed at an earlier stage of the process. Generally it is preferred to start the process off by focussing a low resolution image having a certain number of PE lines by some other means and then build up the image using the method of the present invention adding one phase encode line at a time.

Suppose that from the focussed $I_{2m+1}$ image a (2 m+1)× $n_{fe}$ image $I_{2m+2}$ of marginally higher resolution than $I_{2m+1}$ is formed. This image is obtained by 2-D Fr on the raw K-space data consisting of PE lines k where $-m \leq k \leq m+1$. In general this image may not be focussed, specifically because uncompensated patient motion may have occurred at line k=m+1. As the previous image was focussed it is necessary only to concentrate on the new PE line which have been added. Thus the image is built up from lower resolution images to slightly higher resolution images, and the aim is to estimate δx (FE displacement), δy (FE displacement) and δθ(angular rotation displacement of the patient) for the latest line added, first on the positive side of K-space, then on the negative, and so on. The displacements can, without loss of generality, be considered relative to some 'reference' patient position on the DC line in K-space. Also note that the new PE lines added as the MRI image resolution grows were not necessarily acquired sequentially in time, but this does not matter. Any normal acquisition sequence of PE lines will do. Although a Cartesian acquisition is described here a 'half-Fourier' or spiral types of acquisition could be encompassed in a similar manner with appropriate modifications, as would be understood by a person skilled in the art.

Figure 5:
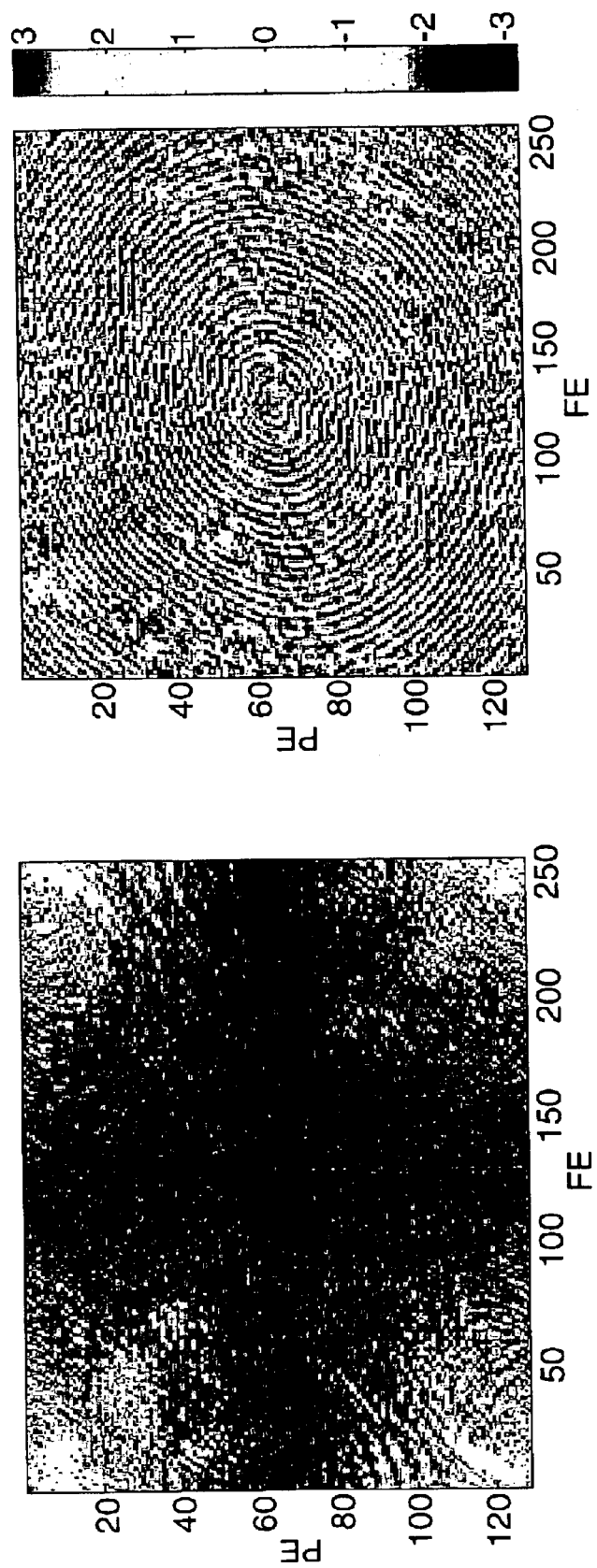
FIG. 5 shows the raw k-space data for the image shown in FIG. 3.

The method proceeds on the basis that it is possible to predict a reasonable approximation $J_{2m+2}$ to a focussed (2 m+2) line image $I^{2m+2}$, from image data associated with the previously focussed image $I_{2m+1}$. The prediction could be performed on the raw k-space data associated with $I^{2m+1}$. However as can be seen in FIG. 5, which shows magnitude and phase plots of the k-space data of the image of FIG. 3, the raw k-space data can have a rapidly varying structure which could make prediction harder. Further every point in k-space affects every point in the image.

Figure 6B:
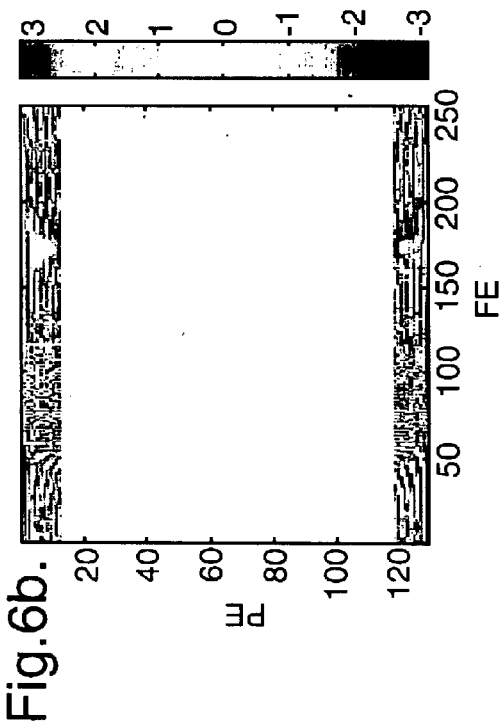
FIG. 6 shows hybrid space data for a low resolution image.
Figure 6A:
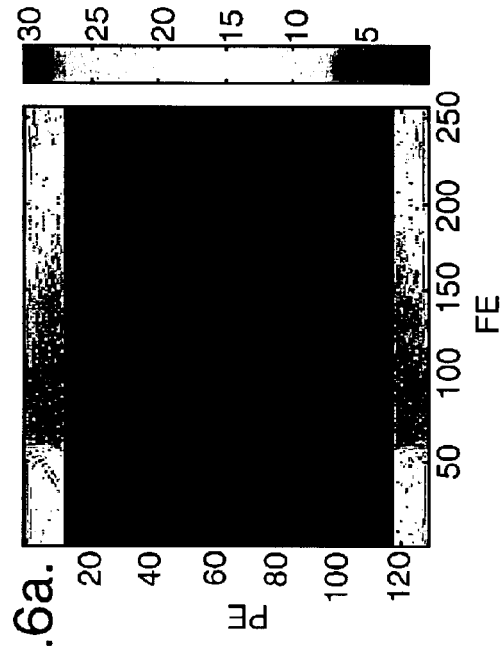

In the present embodiment the prediction was performed on FE-transformed hybrid space, i.e. the k-space data. The FE-transformed hybrid space data, $H_{2m+1}$ was formed by performing a Fourier transform on the raw k-space data along the FE direction. FIG. 6 shows the hybrid space formed on a k-space data set where m=11. Hybrid space varies somewhat less than k-space so it is easier to predict the added lines. Further lines at a given FE position in this FE-transformed hybrid space map to lines at the same FE value in the final image which means that variation of hybrid space is more one dimensional than two dimensional, which also makes prediction easier in hybrid space.

Figure 7A:
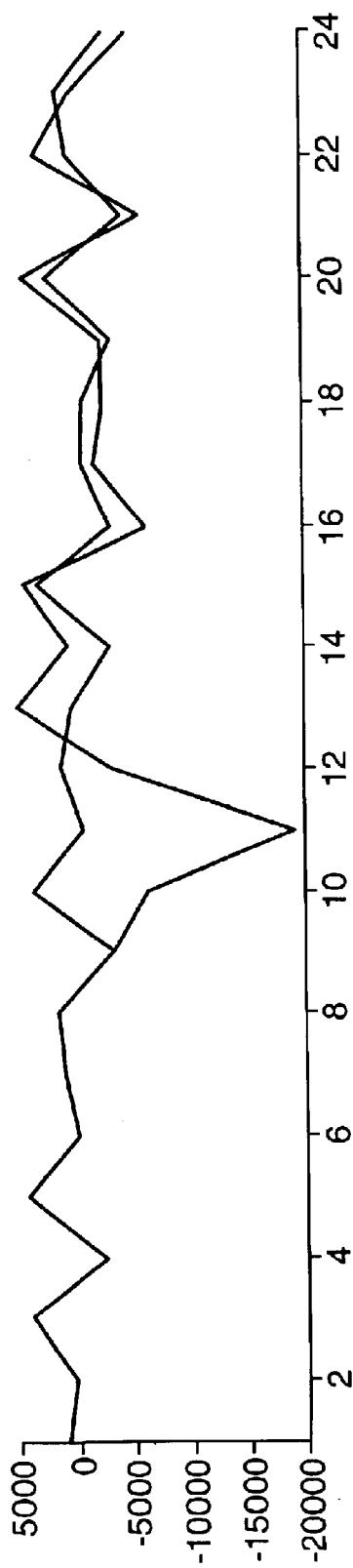
FIG. 7 shows a cross section through the hybrid space of FIG. 6.
Figure 7B:
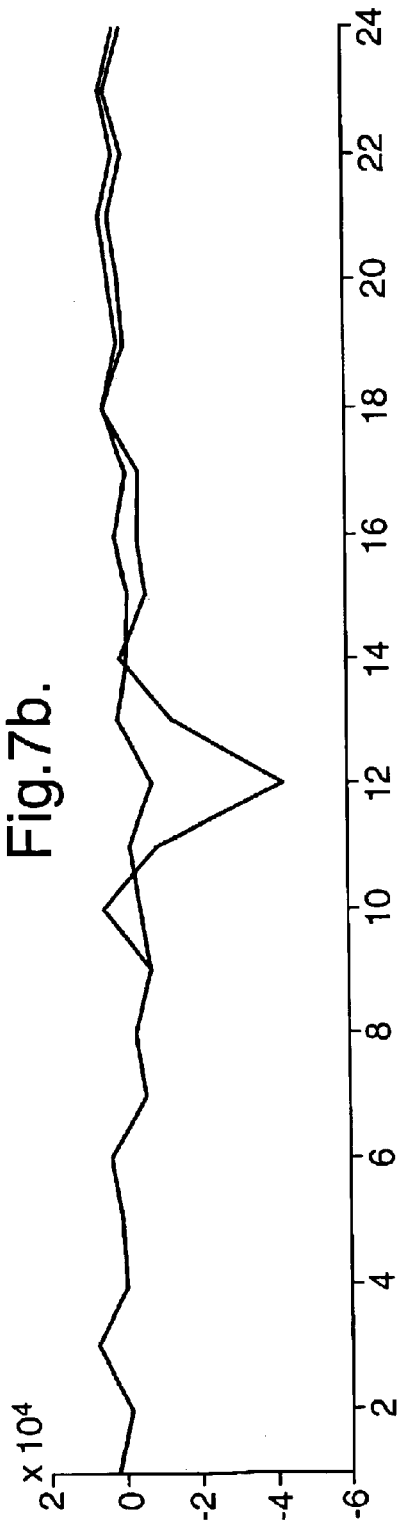

The next line to be added is line k=m+1. For the example shown in FIG. 6 where m=11 the next line is line +12, i.e. 12 PE lines to the right of the DC line Counting the most negative line (line m=−11, eleven lines to the left of DC) as one the next line to be added is line (2 m+2)=24. In order to predict this line the cross-section through hybrid space at all FE values is considered. FIG. 7 shows an example of the cross section at a particular FE value through the hybrid space shown in FIG. 6. FIG. 7a shows the cross section through the real part and FIG. 7b the cross section of the imaginary part. The FE value taken in both cases was FE=1, i.e. the FE displacement assumed was one pixel. The solid line in both figures is the actual cross section for the focused version of $I_{2m+2}$. In order to predict the new data point a fitting algorithm is used on the first 23 points associated with the first hybrid data set (which is already focussed) and extended to predict the $24^{th}$. The predicted fit, which may be obtained by fitting an ARMA series is shown by the dashed line. The particular fitting and prediction algorithm chosen here is the Prony algorithm, which fits an AutoRegressive Moving Average (ARMA) series (i.e. a linear prediction filter) to the first 23 points in the example, and then extrapolates this to point 24. It should be noted that in FIG. 7 the actual $24^{th}$ point is shown for comparison with the predicted point. It can be seen that the predicted point is fairly close to the value of the $24^{th}$ point of a focussed image. Although a particular linear prediction algorithm has been named here. there are other candidates which may be even more suitable. Moreover a non-linear predictor could even be considered if its performance was superior to linear ARMA-type prediction.

This process is repeated for each section through hybrid space, at different FE positions, to generate a 2 m+2-line in hybrid space, which has been predicted forward from its first 2 m+1 PE lines to its 2 m+2'th line.

Figure 8B:
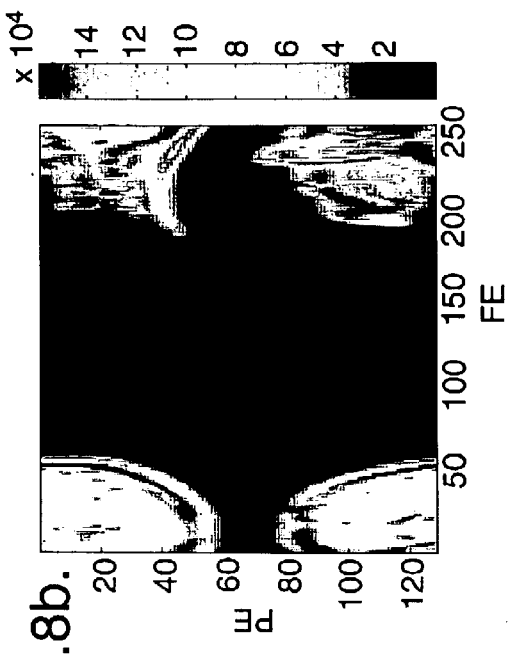
FIG. 8 shows the focussed and predicted images for a low resolution image.
Figure 8A:
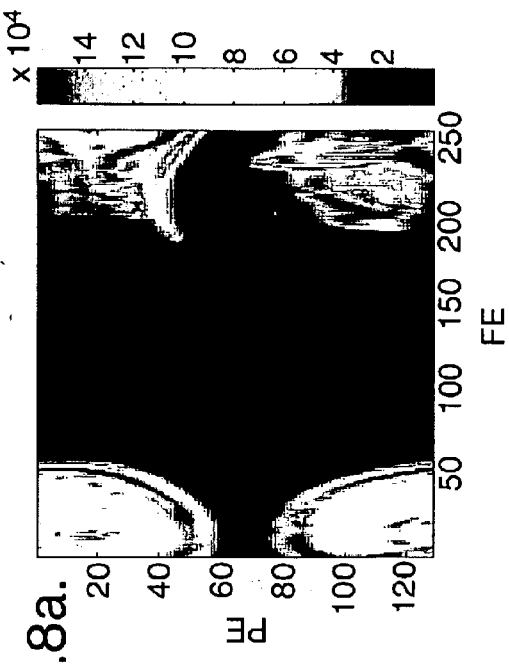

One could then perform a Fourier transform along the PE direction to generate a 'predicted' 2 m+2-line image $J_{2m+2}$. Such a predicted image is shown in FIG. 8b compared with the actual focussed image which is shown in FIG. 8a. Note that the image has been Fourier shifted so it appears as four quarters in order to minimise the phase variation in raw and hybrid space. While the images appear visually quite close, this does not prove that the phase of the K-space of the predicted focused (2 m+2)-line image will be well enough behaved to be able to meaningfully compare it to the phase of the actual image, possibly defocused on line 2 m+2. Nevertheless, it has been shown by computer simulation that the phase is adequate for such a comparison.

Specifically, the complex predicted focused image $J_{2,+2}$ is converted, via an inverse 2-D FT, to a raw k-space format $J_{2m+2}^{raw}$. The pointwise ratio of the actual new defocused line added to k-space is then formed with the corresponding line in the predicated k-space data $J_{2m+2}^{raw}$. The latter line is a prediction of a supposedly focused line, whereas the first line in the vector ratio has the linear phase variation due to an FE-displacement. Therefore if the prediction is adequate, thus linear phase will be discernible in the pointwise ratio of the two lines. In fact, if the vector ratio is Fourier Transformed, the linear phase due to motion in the fe-direction will be detectable as a spectral maximum in a position (relative to DC) which gives the amount of the fe displacement, δx, occurring on the line+m+1. The presence of such spectral maxima occurring in the right place has been verified in simulations, and is independent of the amount of PE displacement present.

Once the extent of any displacement in the frequency encode diction has been determined it is necessary to estimate directly the amount of PE displacement. First one compensates the k-space data for any FE displacement just determined. Then one compares, on the new pe-line at DC+m+1, the phase of the hybrid space for the actual defocused image $I_{2m+2}$ with the phase of the predicted focused image. As for determining fe-displacements as described above, this comparison is done over all fe-positions. The result is a vector of complex numbers, which are then averaged before the phase is taken, to give a better estimate of phase offset due to PE displacement δy. As is well known by one skilled in the art and easily derived, the phase offset is theoretically given by $2\pi,\delta y.(m+1)/nPE$ where nPE is the number of PE lines in the full resolution image and δy is the pe displacement. Thus the phase offset can be used to give the extent of any displacement in the PE direction. The k-space data can then be compensated for any such displacement and a data set focussed for any PE or FE translational displacements which result.

As an alternative to averaging the complex vector to determine PE displacements, the phase of the FE spectral maximum, obtained as described above, may be used. This may be preferable when there are Modulo 2π effects on the FE phase as happens at higher spatial frequencies.

Having determined the PE and FE displacements one can determine the image rotation in an image. Conveniently the amount of rotation is determined by comparing the image formed using the predicted data line with the image formed using the actual data line. From a comparison of the two images the extent of rotation on the added line can be determined.

Having arrived at a 2 m+2 line focused low resolution image, this image may be used as a starting point for adding a PE line on the negative side of DC at k0=−m−1, and performing an analogous prediction process on the negative side of K-space, i.e. setting the newly focussed image as the first data set. Following this step the whole process may be repeated again but starting with a slightly higher resolution 2 m+3 line focused image instead of the 2 m+1 line focused image which was the original starting point. The whole procedure is therefore repeated inductively working up from low-resolution images to higher resolution.

In one embodiment of the present invention therefore the procedure might typically proceed as follows:
i) take a first data set of a number of phase encode lines corresponding to a focussed first image,
ii) add a line on one side of the first data set to form a second data set,
ii) perform a ID FT on the first data set to form a hybrid space first data set,
iv) take a cross section through the hybrid space first data set at a particular value of FE and use a fitting algorithm to predict the next complex data point added, v) repeat step (iv) for all values of FE to form a predicted added line in hybrid space, vi) transform the hybrid space first data set and predicted added line to form a predicted k-space added line, vii) form the pointwise ratio of the predicted k-space added line with the actual k-space added line and determine the linear phase shift, viii) correct the actual k-space added line to compensate for the linear phase shaft, ix) FT the corrected k-space data to form a hybrid space data set, x) compare the predicted line of the hybrid space data set with the corrected added line in hybrid space and determine the phase offset, xi) correct the k-space data to correct for the determined phase offset, xii) repeat steps (i) to (xi) taking the fully corrected k-space data set as the new first data set until full resolution is achieved.

The present invention has been described above in relation to one particular acquisition scheme and prediction means. The skilled person would be aware however that other schemes and predictions could be used without departing from the essence of the present invention.

What is claimed is:

1. A method of producing an image of a scanned object corrected for artefacts introduced by unwanted motion of said object during the scan comprising the steps of taking a k-space image data set comprising a number of data points derived from the object scan, forming an first data set from some of the k-space image data points, adding at least one additional data point to the first data set to form a second data set, predicting, from the first data set, the at least one added data point, comparing the at least one added data point with the predicted at least one data point to determine the extent of any motion and correcting the at least one added data point to compensate for any detected motion.

2. A method as claimed in claim 1 wherein the prediction is carried out using the raw k-space first data set.

3. A method as claimed in claim 1 wherein the prediction is carried out in image space using an image formed from the first data set.

4. A method as claimed in claim 1 wherein the prediction is performed in hybrid space.

5. A method as claimed in claim 4 wherein tho hybrid space is formed by performing a one dimensional Fourier transform of k-space in the frequency encode direction.

6. A method as claimed in claim 1 wherein the phase of the first data set is used to predict the phase of the added data.

7. A method as claimed in claim 6 wherein the predicted phase is with the actual phase of the added at least one data point and the difference between them used to determine the extent of any motion.

8. A method as claimed in claim 1 wherein displacement in one of the frequency encode direction and phase encode directions is determined before determining any displacement in the other direction.

9. A method as claimed in claim 8 wherein the displacement in one direction is compensation for before the extent of any displacement in the other direction is determined.

10. A method according to claim 1 wherein the method is used inductively with a corrected data set being used as the first data set in another iteration.

11. A method according to claim 1 wherein the first data set comprises a number of phase encode lines.

12. A method according to claim 1 wherein the data points added to the first data set to form the second data set comprise a number of phase encode lines.

13. A method according to claim 12 wherein the number of phase encode lines added to the first data get to form the second data set is one.

14. A method as claimed in claim 1 wherein the method is performed iteratively and the starting first data set comprises a plurality of phase encode lines which have previously been focussed.

15. A method according to claim 1 wherein displacements in the frequency encode direction are determined by steps of performing a 1D Fourier transform along the Frequency encode direction on the first k-space data set to form an hybrid space data set, analysing the hybrid space data set to predict the next line of hybrid space data, transforming the hybrid space data and predicted line into k-space to provide a predicted line in k-space, forming a pointwise ratio of the predicted k-space line to the actual k-space line added and determining the amount of linear phase variation between the actual and predicted lines as an estimation of displacement in the FE direction.

16. A method according to claim 1 wherein the object scan is performed with a magnetic resonance imager.

17. A computer programme for automatic focussing of an MRI image comprising a programme for implementing the method of claim 1.

\* \* \* \* \*